(12) United States Patent
Ohashi

(10) Patent No.: US 9,895,999 B2
(45) Date of Patent: Feb. 20, 2018

(54) FUEL CELL VEHICLE

(71) Applicant: TOYOTA JIDOSHA KABUSHIKI KAISHA, Toyota-shi, Aichi-ken (JP)

(72) Inventor: Yasuhiko Ohashi, Toyota (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 0 days.

(21) Appl. No.: 15/291,119

(22) Filed: Oct. 12, 2016

(65) Prior Publication Data

US 2017/0101031 A1 Apr. 13, 2017

(30) Foreign Application Priority Data

Oct. 13, 2015 (JP) .................... 2015-202195

(51) Int. Cl.
*B60K 11/04* (2006.01)
*B60L 11/18* (2006.01)
(Continued)

(52) U.S. Cl.
CPC ............ *B60L 11/1896* (2013.01); *B60K 1/04* (2013.01); *B60K 11/04* (2013.01); *B60K 15/03006* (2013.01); *B60K 15/07* (2013.01); *B60L 11/1883* (2013.01); *H01M 8/04201* (2013.01); *B60K 2001/0411* (2013.01); *B60K 2015/0634* (2013.01); *B60Y 2200/91* (2013.01); *B60Y 2306/01* (2013.01); *B60Y 2400/202* (2013.01);
(Continued)

(58) Field of Classification Search
CPC ....... B60L 11/1896; B60K 11/04; B60K 1/04; B60K 15/03006
See application file for complete search history.

(56) References Cited

U.S. PATENT DOCUMENTS 5,641,031 A * 6/1997 Riemer ............... B60K 1/04
180/68.5
6,378,637 B1 * 4/2002 Ono .................. B60K 1/04
180/65.31
(Continued)

FOREIGN PATENT DOCUMENTS

JP       2008-230519       10/2008
WO    WO 2012/004829 A1    1/2012

*Primary Examiner* — John Walters
*Assistant Examiner* — James Triggs
(74) *Attorney, Agent, or Firm* — Finnegan, Henderson, Farabow, Garrett & Dunner, LLP

(57) ABSTRACT

The present invention provides a fuel cell vehicle that is capable of suppressing rotation of a fuel cell when a vehicle collision occurs and minimizing damage to the fuel cell and auxiliary apparatuses.

A fuel cell vehicle 1 comprises: a radiator 11 provided in a front room 10; and a fuel cell assembly 12 provided in a vehicle rear direction with respect to the radiator 11 in the front room 10. The fuel cell assembly 12 comprises: an assembly frame 60; and a fuel cell apparatus group 61 that includes a fuel cell 70 and an auxiliary apparatus, the fuel cell apparatus group 61 being integrally mounted to the assembly frame 60. The assembly frame 60 protrudes more than the fuel cell apparatus group 61, toward the radiator 11 at the front side. The fuel cell assembly 12 is installed in the front room 10 such that a height of a front edge part A of the assembly frame 60 at a front side approximately matches a height of a center of gravity P of the entire fuel cell assembly 12.

13 Claims, 14 Drawing Sheets

(51) Int. Cl.
- *B60K 1/04* (2006.01)
- *B60K 15/03* (2006.01)
- *H01M 8/04082* (2016.01)
- *B60K 15/07* (2006.01)
- *B60K 15/063* (2006.01)

(52) U.S. Cl.
CPC .... *H01M 8/04082* (2013.01); *H01M 2250/20* (2013.01); *Y02T 90/32* (2013.01)

(56) References Cited

U.S. PATENT DOCUMENTS

| | | | |
|---|---|---|---|
| 7,896,115 B2 * | 3/2011 | Ono | B60K 1/04 180/65.31 |
| 8,408,345 B2 | 4/2013 | Ohashi | |
| 2012/0279792 A1 | 11/2012 | Katano | |
| 2014/0110185 A1 * | 4/2014 | Naito | B60L 3/0007 180/65.31 |
| 2014/0367182 A1 * | 12/2014 | Yoshinaga | B60L 11/1898 180/68.4 |

\* cited by examiner

FUEL CELL VEHICLE

CROSS-REFERENCES TO RELATED APPLICATIONS

This application relates to and claims priority from Japanese Patent Application No. JP2015-202195, filed on Oct. 13, 2015, the entire disclosure of which is incorporated herein by reference.

BACKGROUND

Field

The present invention relates to a fuel cell vehicle.

Description of Related Art

A fuel cell vehicle is equipped with a fuel cell and its peripheral devices (auxiliary apparatuses) in a front room at a front side of the vehicle (see WO2012/004829). Moreover, for fuel cell vehicles, it is necessary to take measures to protect the fuel cell during a collision at the front side, and an air bag, for example, may be provided inside a casing of the fuel cell (see JP2008-230519 A).

SUMMARY

However, even if measures as described are taken, if the vehicle violently collides while running, it is considered that the fuel cell will bump into a radiator at the front side of the front room due to inertial force, and a torque will be exerted starting from the bumped part, causing the fuel cell to rotate. In this case, it is difficult to predict where the fuel cell will bump into, and therefore, it is difficult to take measures to prevent the fuel cell and its peripheral auxiliary apparatuses from being damaged during a collision.

The present application has been made in view of the above points and the object of the present invention is to provide a fuel cell vehicle that is capable of suppressing rotation of a fuel cell when a vehicle collision occurs and minimizing damage to the fuel cell and its peripheral auxiliary apparatuses.

As a result of intensive examinations, the present inventors were able to achieve the present invention by finding out that rotation of a fuel cell can be suppressed when a vehicle collision occurs by integrating the fuel cell and auxiliary apparatuses with an assembly frame so as to form a fuel cell assembly and configuring the height of a center of gravity of the fuel cell assembly and the height of a front edge of the assembly frame at a radiator side so as to be approximately equal.

Namely, the present invention includes the following embodiments.

(1) A fuel cell vehicle, comprising: a radiator provided in a front room; and a fuel cell assembly provided in a vehicle rear direction with respect to the radiator in the front room, wherein the fuel cell assembly comprises: an assembly frame; and a fuel cell apparatus group that includes a fuel cell and an auxiliary apparatus, the fuel cell apparatus group being integrally mounted to the assembly frame, wherein the assembly frame protrudes toward the radiator side with respect to the fuel cell apparatus group, and wherein the fuel cell assembly is installed in the front room such that a height of a front edge of the assembly frame at a vehicle front side approximately matches a height of a center of gravity of the entire fuel cell assembly.

(2) The fuel cell vehicle according to (1), wherein the assembly frame is formed into a flat plate shape, and the fuel cell apparatus group is integrally mounted to upper and lower surfaces of the assembly frame.

(3) The fuel cell vehicle according to (1) or (2), wherein the assembly frame is provided in a tilted attitude such that the vehicle front side is high and a vehicle rear side is low.

(4) The fuel cell vehicle according to any one of (1)-(3), wherein the front edge of the assembly frame at the vehicle front side is at a higher position than that of a motor shaft of a fan of the radiator.

(5) The fuel cell vehicle according to any one of (1)-(4), wherein the fuel cell apparatus group mounted to an underside of the assembly frame is disposed at a position that is deviated in a width direction of the vehicle from a vehicle rear position on an extension line of the motor shaft of the fan of the radiator.

(6) The fuel cell vehicle according to any one of (1)-(5), wherein a buffer member is provided between the fuel cell apparatus group and the radiator.

(7) The fuel cell vehicle according to (6), wherein an air cleaner, an air intake or an ion exchanger is used for the buffer member.

(8) The fuel cell vehicle according to any one of (1)-(7), wherein the front edge of the assembly frame at the vehicle front side is a pointed member.

(9) The fuel cell vehicle according to (8), wherein the pointed member is an electric conductor.

(10) The fuel cell vehicle according to any one of (1)-(9), wherein the vehicle rear side of the fuel cell assembly is provided with a dash panel that separates the front room from a passenger compartment, and wherein an end face of the fuel cell at the vehicle rear side is provided with a panel stiffening plate which comes into surface collision with the dash panel when the fuel cell assembly collides with the dash panel.

(11) The fuel cell vehicle according to any one of (1)-(10), wherein a lower part of the vehicle rear side of the fuel cell assembly is provided with a fuel gas tank, and an end part of the fuel cell assembly at the vehicle rear side is provided with a tank stiffening plate which comes into surface collision with the fuel gas tank when the fuel gas tank collides with the fuel cell assembly.

(12) The fuel cell vehicle according to (11), wherein the tank stiffening plate is configured so as to allow the vehicle front side of the collided fuel gas tank to escape below.

(13) The fuel cell vehicle according to any one of (1)-(12), wherein the auxiliary apparatus includes at least a boosting converter, an inverter, a pump or an air compressor, and wherein the fuel cell, the boosting converter and the inverter of the fuel cell apparatus group are provided above the assembly frame, and the pump and the air compressor are provided beneath the assembly frame.

DETAILED DESCRIPTION

Figure 1:
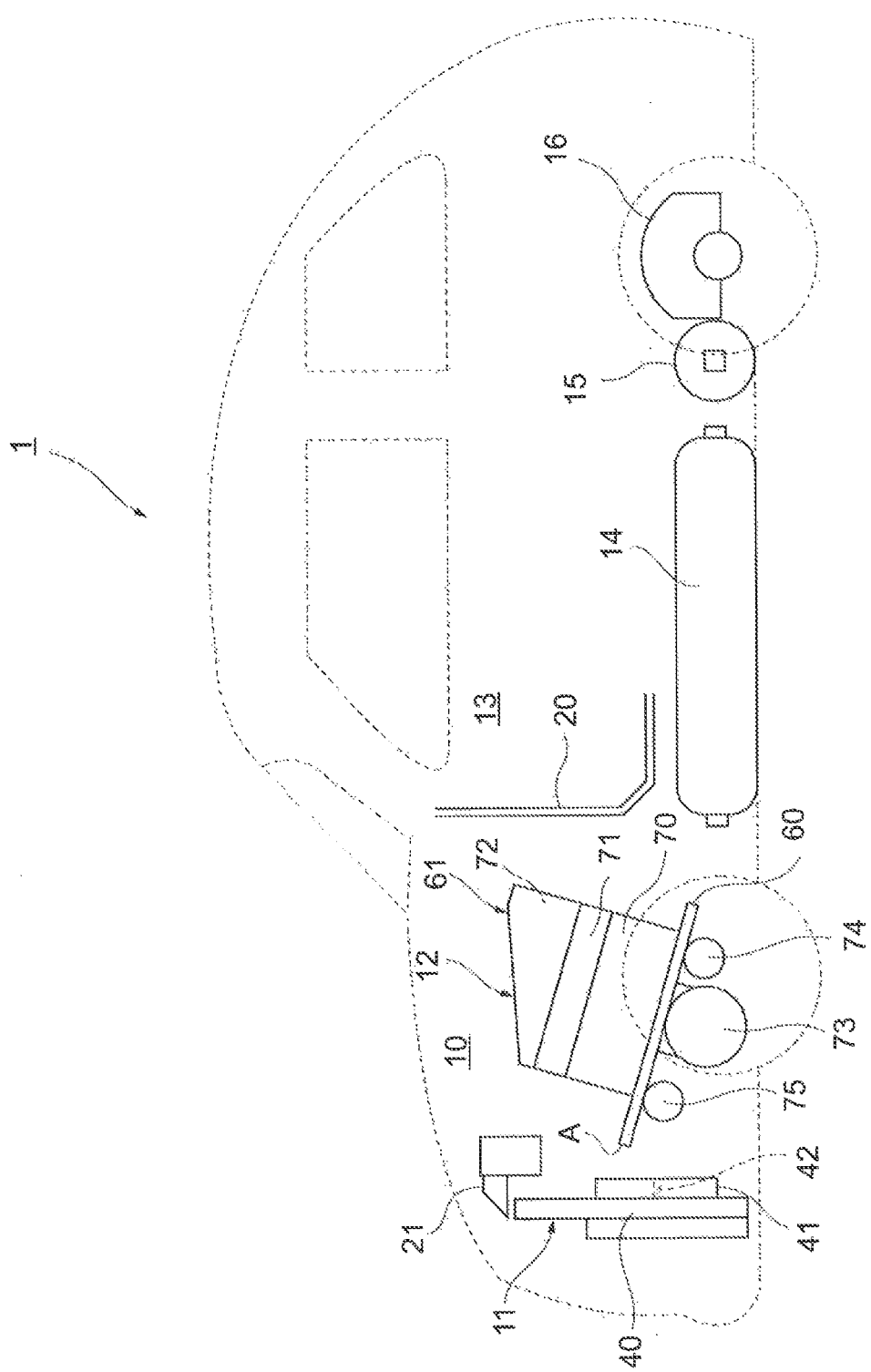
FIG. 1 is an explanatory drawing showing an overview of an internal configuration of a fuel cell vehicle.

The embodiments of the present invention will be described in detail below. Unless specifically indicated, the positional relationship such as the vertical and horizontal positions in the drawings are based on the positional relationship shown in the drawings. The size proportion of the drawings is not limited to the proportion shown in the drawings. Furthermore, the embodiments described below are exemplifications for describing the present invention and are not intended to limit the present invention only to such embodiments. In addition, various modifications of the present invention may be made as long as such modifications do not depart from the essence of the invention.

Figure 2:
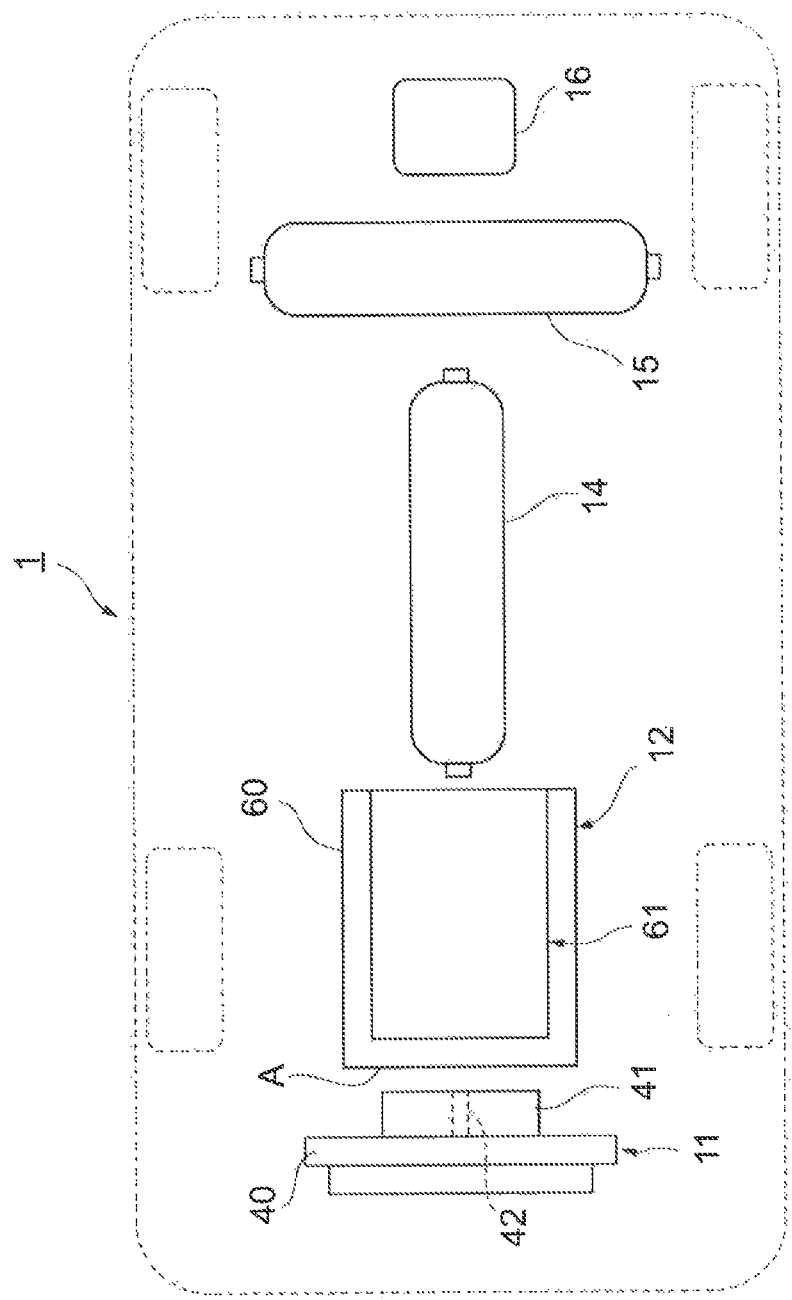
FIG. 2 is an explanatory drawing of an internal configuration of a fuel cell vehicle seen from a plan view.

FIG. 1 is a schematic diagram showing an overview of a configuration of a fuel cell vehicle 1 according to the present embodiment. FIG. 2 is a schematic diagram showing an overview of a configuration of a fuel cell vehicle 1 seen from a plan view.

A fuel cell vehicle 1 is, for example, an FR (front-engine, rear-wheel-drive) car, and comprises a radiator 11 and a fuel cell assembly 12 in a front room 10. The fuel cell vehicle 1 comprises fuel gas tanks 14,15 beneath a passenger compartment 13 and comprises a drive motor 16 at a rear wheel part. The fuel gas tank 14 is disposed pointing in a front-back direction (horizontal direction in FIGS. 1 and 2) of the vehicle 1 (caps pointing in a front-back direction) and the fuel gas tank 15 is disposed pointing in a width direction (vertical direction in FIG. 2) of the vehicle 1 (caps pointing in a width direction). As shown in FIG. 1, a dash panel 20 that separates the passenger compartment 13 from other areas is provided at the rear side of the front room 10. An intake system 21, for example, is provided above the radiator 11.

Figure 3:
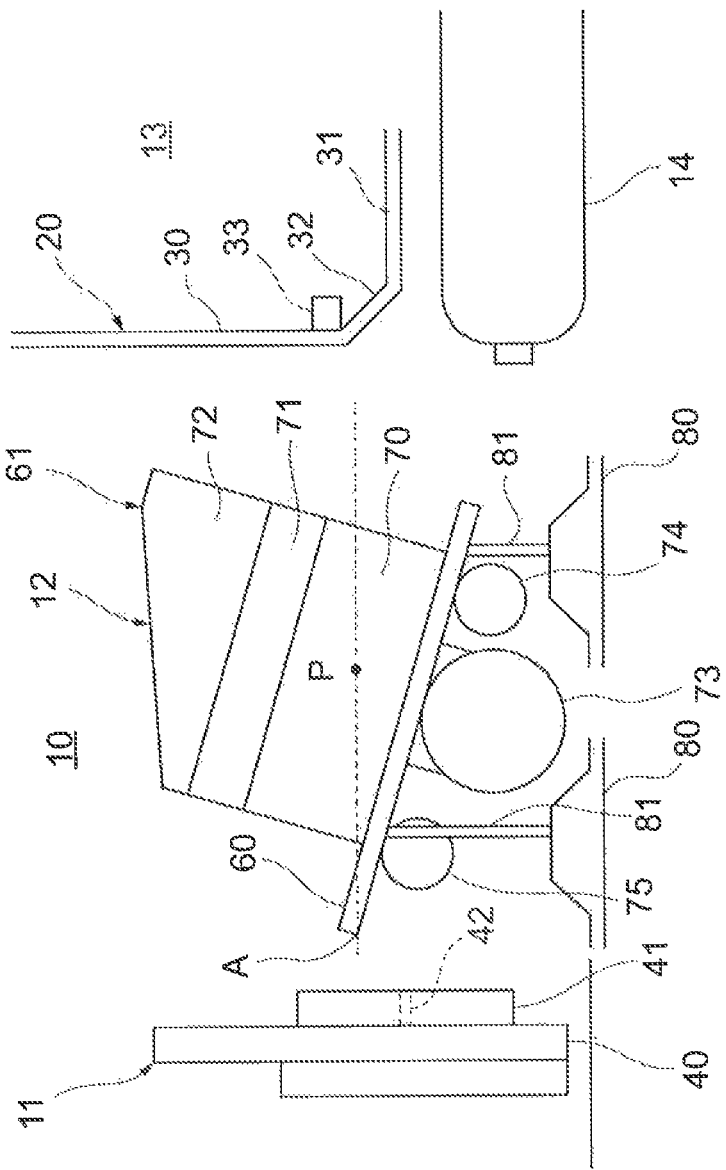
FIG. 3 is an explanatory drawing showing an overview of an internal configuration of a front room.

As shown in FIG. 3, the dash panel 20 includes, for example, an upright part 30 provided between the front room 10 and the passenger compartment 13, a horizontal part 31 provided below the passenger compartment 13 and a tilt part 32 that connects the upright part 30 and the horizontal part 31. For example, a tunnel cross 33 is provided at the connection between the tilt part 32 and the upright part 30 in order to increase intensity.

The radiator 11 includes a casing 40 having a shape of a rectangular plate and a fan 41 at the rear side of the casing 40. The fan 41 includes a horizontal motor shaft 42 extending in a front-back direction.

The fuel cell assembly 12 includes an assembly frame 60 and a fuel cell apparatus group 61 integrally mounted to the assembly frame 60.

The assembly frame 60 is made of, for example, strong aluminum or stainless steel and is formed into a shape of a thick rectangular plate as shown in FIGS. 2 and 3.

As shown in FIG. 3, the fuel cell apparatus group 61 comprises a fuel cell 70 and a plurality of auxiliary apparatuses which are peripheral devices thereof. The auxiliary apparatuses may include, for example, a boosting converter 71 which increases the electric power of the fuel cell 70, an inverter 72 which converts DC voltage to AC voltage in the fuel cell 70, an air compressor 73 which takes in oxidant gas from the atmosphere, a fuel gas pump 74 which supplies a fuel gas to the fuel cell 70 and a cooling pump 75 which sends cooling water to the fuel cell 70. The auxiliary apparatuses of the fuel cell apparatus group 61 installed in the fuel cell assembly 12 are not limited to these and may also include a battery that functions as a storage source for excess electric power, a storage source for regenerative energy during regenerative braking and an energy buffer during load variations involved in acceleration or deceleration of a fuel cell vehicle 1, a humidifier for humidifying oxidant gas, a power control unit, a regulator or an injector for supplying the fuel gas to the fuel cell 70, or other pumps or valves.

For example, at the top surface side of the assembly frame 60, a fuel cell 70, a boosting converter 71 and an inverter 72 are stacked in order from the bottom, and such fuel cell 70, boosting converter 71 and inverter 72 are integrally fixed to the assembly frame 60 by, for example, a bolt, etc.

At the lower surface side of the assembly frame 60, an air compressor 73, a fuel gas pump 74 and a cooling pump 75 are disposed, and such air compressor 73, fuel gas pump 74 and cooling pump 75 are integrally fixed to the assembly frame 60 by, for example, a bolt, etc.

The assembly frame 60 protrudes more than the fuel cell apparatus group 61, toward the radiator 11 at the front side. Namely, even if a strong external force in a front-back direction acts on the vehicle 1, causing the fuel cell assembly 12 to move due to inertial force and bump into the radiator 11, the fuel cell apparatus group 61 does not collide with the radiator 11 first, but the assembly frame 60 collides with the radiator 11 first. Moreover, the width of the assembly frame 60 is also formed so as to protrude more than the fuel cell apparatus group 61 in a width direction.

The fuel cell assembly 12 is installed in the front room 10 such that the height of a front edge part A of the assembly frame 60 at the front side approximately matches the height of the center of gravity P of the entire fuel cell assembly 12. The term "approximately equal" may substantially be within the range where the fuel cell assembly 12 does not rotate around the front edge part A of the assembly frame 60 as a pivot point when the front edge part A of the assembly frame 60 collides with the radiator 11, and a deviation of few centimeters is within an acceptable range. An adjustment of the height of the center of gravity P of the fuel cell assembly 12 can be made, for example, through selection of the models of auxiliary apparatuses installed in the fuel cell assembly 12 and the positions thereof as well as through adjustments of a tilt angle, etc. of the assembly frame 60 with respect to the horizontal surface.

The attitude of the assembly frame 60 is tilted such that the front side is high and the rear side is low. The front edge part A of the assembly frame 60 at the front side is at a higher position than that of the motor shaft 42 of the fan 41 of the radiator 11.

The fuel cell assembly 12 is, for example, integrally mounted to the vehicle body through a mount 81 which connects the assembly frame 60 with a suspension member 80 of the fuel cell vehicle 1.

Figure 4:
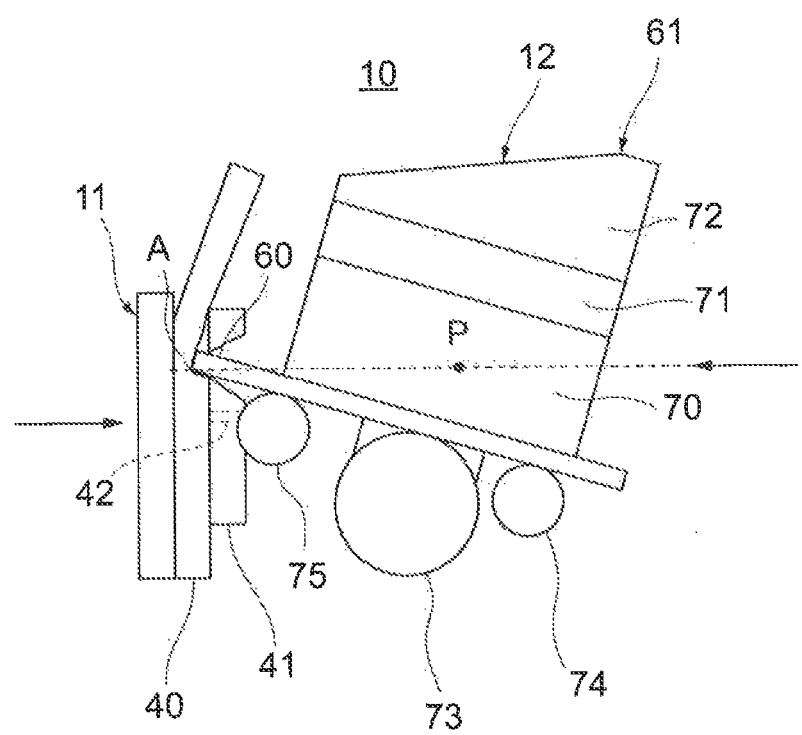
FIG. 4 is an explanatory drawing showing a state in which a fuel cell assembly collides with a radiator.

According to the present embodiment, the assembly frame 60 and the fuel cell apparatus group 61 integrally form the fuel cell assembly 12, and the front edge part A of the assembly frame 60 at the front side protrudes more than the fuel cell apparatus group 61 toward the front side. The height of the front edge part A of the assembly frame 60 at the front side is approximately equal to the height of the center of gravity P of the entire fuel cell assembly 12. For example, as shown in FIG. 4, when a collision occurs at the front side of the fuel cell vehicle 1 and a large external force acts on the front side of the vehicle 1, the radiator 11 moves backward or the fuel cell assembly 12 moves forward due to inertial force, thereby causing the front edge part A of the assembly frame 60 to collide with the radiator 11. Since the height of the front edge part A of the assembly frame 60 is generally the same as the height of the center of gravity P of the fuel cell assembly 12 at this point, torque is hard to occur and the fuel cell assembly 12 is suppressed from rotating around the front edge part A of the assembly frame 60 as a pivot point. The assembly frame 60 that bumped into the radiator 11 destroying the radiator 11 or the front edge of the assembly frame 60 being crushed causes the collision energy of the fuel cell assembly 12 to be absorbed, and the fuel cell assembly 12 stops while roughly maintaining its attitude. This enables the rotation of the fuel cell 70 to be suppressed and the collision location of the fuel cell assembly 12 to be roughly predicted, and therefore, the damage to the fuel cell 70 can be stably prevented. Moreover, since the auxiliary apparatuses which are peripheral devices of the fuel cell 70 are integrated with the fuel cell assembly 12, the damage thereto can also be stably prevented.

According to the present embodiment, the assembly frame 60 is formed into a flat plate shape and the fuel cell apparatus group 61 is integrally mounted to the upper and lower surfaces of the assembly frame 60. Therefore, the position of the fuel cell apparatus group 61 has a high degree of freedom, and the height of the center of gravity P of the fuel cell assembly 12 and the height of the front edge part A of the assembly frame 60 can be easily aligned.

Moreover, since the attitude of the assembly frame 60 is tilted such that the front side is high and the rear side is low, it is easier to align the height of the center of gravity P of the fuel cell assembly 12 with the height of the front edge part A of the assembly frame 60. The drainage of water generated by the fuel cell 70 during electric power generation can also be improved.

Since the front edge part A of the assembly frame 60 is at a higher position than that of the motor shaft 42 of the fan 41 of the radiator 11, during a collision, the front edge part A of the assembly frame 60 does not collide with the hard motor shaft 42 but instead collides with other soft parts of the radiator 11. This causes the collision part of the radiator 11 due to the assembly frame 60 to crush sufficiently during collision, and therefore, the collision energy of the fuel cell assembly 12 can be sufficiently absorbed.

Figure 5:
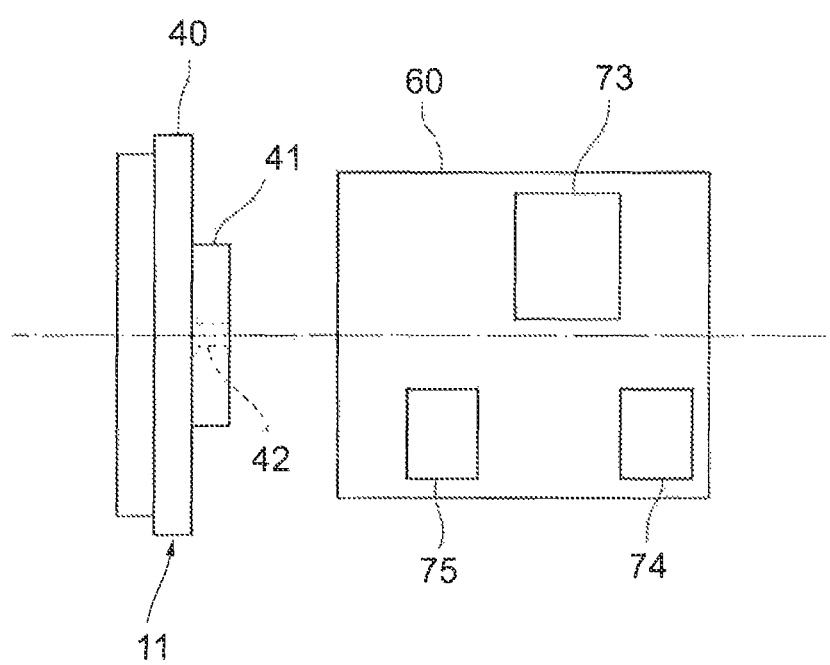
FIG. 5 is an explanatory drawing showing an example of an arrangement of auxiliary apparatuses at a lower surface of an assembly frame.

In the above-mentioned embodiment, as shown in FIG. 5, the fuel cell apparatus group 61 (e.g. air compressor 73, fuel gas pump 74, cooling pump 75) that is mounted to the underside of the assembly frame 60 may be disposed at a position that is deviated in a width direction of the vehicle from the rear position on the motor shaft 42 of the radiator 11. In this case, the fuel cell apparatus group 61 at the lower surface side of the assembly frame 60 can be suppressed from directly bumping into the hard motor shaft 42, thereby preventing the fuel cell apparatus group 61 from being damaged. Moreover, since the assembly frame 60 collides with the fan 41 and crushes without the fuel cell apparatus group 61 bumping into the motor shaft 42, the collision energy can be sufficiently absorbed.

Figure 6:
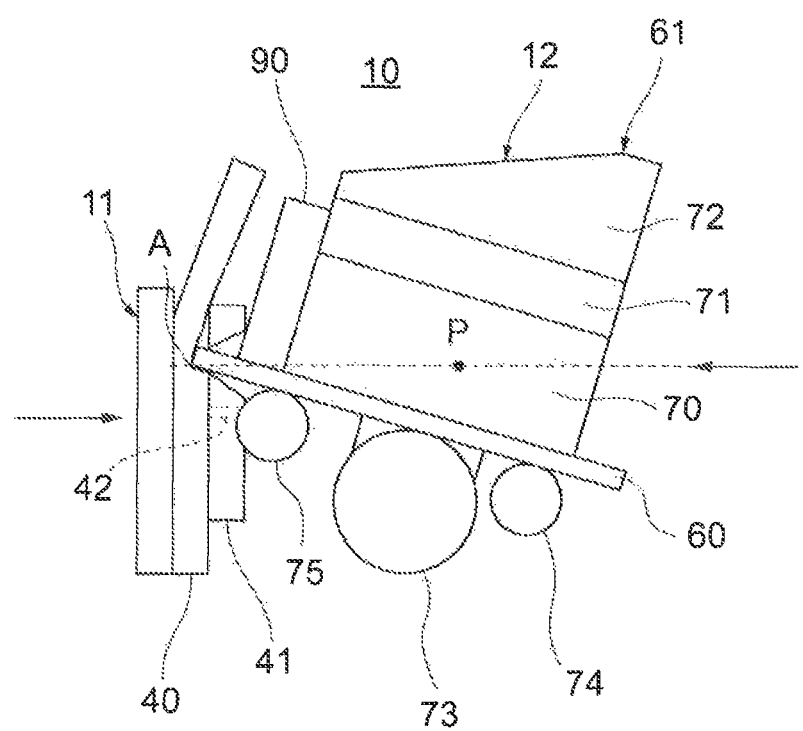
FIG. 6 is an explanatory drawing showing a state in which a fuel cell assembly equipped with a buffer member collides with a radiator.

In the above-mentioned embodiment, as shown in FIG. 6, a buffer member 90 may be provided between the fuel cell apparatus group 61 and the radiator 11. The buffer member 90 may be, for example, a box-shaped rectangular solid and may be made of resin. The buffer member 90 may be a metal pipe. The buffer member 90 may be mounted at the fuel cell apparatus group 61 side or the radiator 11 side. In this case, when the assembly frame 60 collides and the radiator 11 is damaged, the damaged part can be prevented from hitting the fuel cell apparatus group 61. This enables the fuel cell apparatus group 61 to be protected from the damaged radiator 11. Furthermore, the inertial force of the fuel cell apparatus group 61 that was generated during the collision can be absorbed by the buffer member 90 and the collision energy of the fuel cell apparatus group 61 can be reduced. The more the collision energy is absorbed by the buffer member 90, the shorter the protruding length of the assembly frame 60 in the front-back direction can be.

Figure 7:
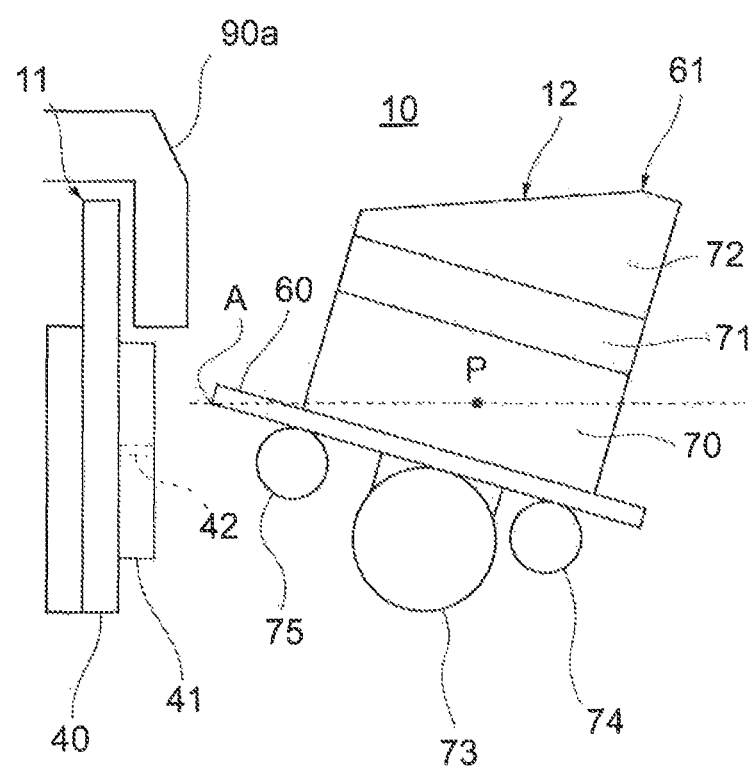
FIG. 7 is an explanatory drawing showing a state in which a fuel cell assembly using an air cleaner as a buffer member collides with a radiator.
Figure 8:
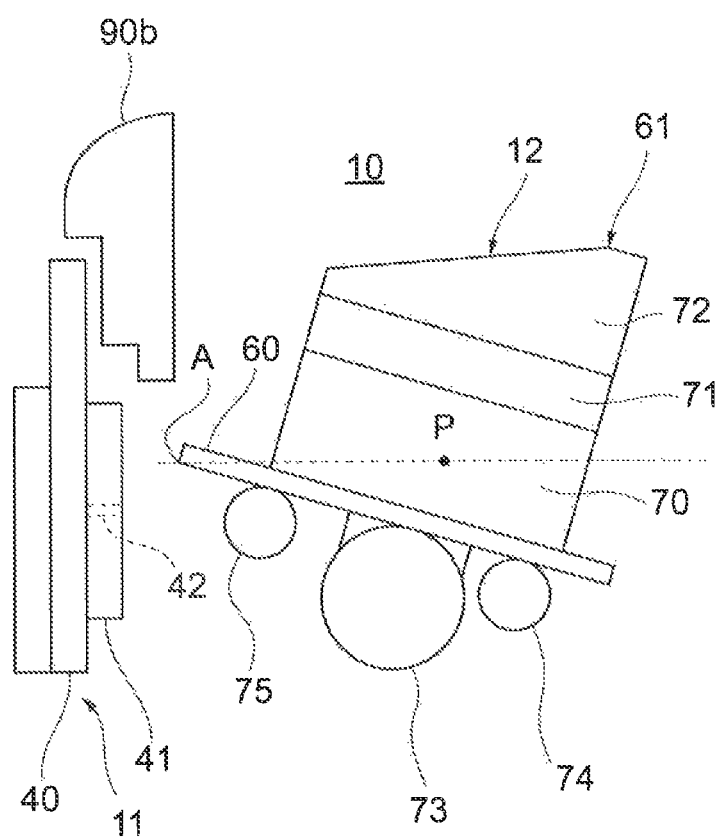
FIG. 8 is an explanatory drawing showing a state in which a fuel cell assembly using an air intake as a buffer member collides with a radiator.
Figure 9:
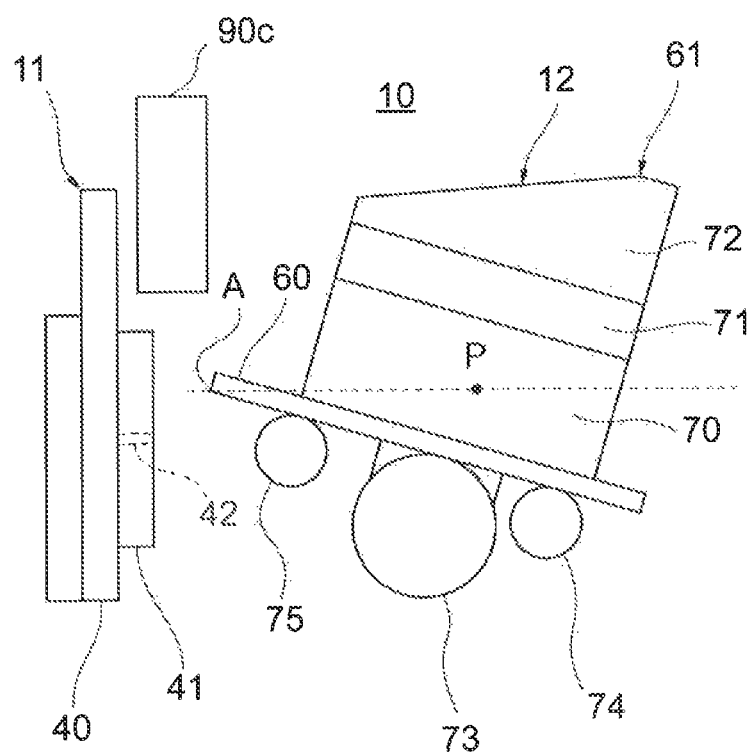
FIG. 9 is an explanatory drawing showing a state in which a fuel cell assembly using an ion exchanger as a buffer member collides with a radiator.

In the above-mentioned embodiment, as shown in FIGS. 7-9, an air cleaner 90a, an air intake 90b or an ion exchanger 90c of the fuel cell vehicle 1 may be used for the buffer member 90. The air cleaner 90a is for cleaning air inducted from the air intake 90b and the air intake 90b is for taking in outside air. The ion exchanger 90c, for example, is for removing ions from cooling water that cools the fuel cell 70. The casings of the air cleaner 90a, air intake 90b and ion exchanger 90c are made of resin. In such way, through the use of existing apparatuses as the buffer member 90, it is not necessary to provide a new member for the buffer member.

Figure 10:
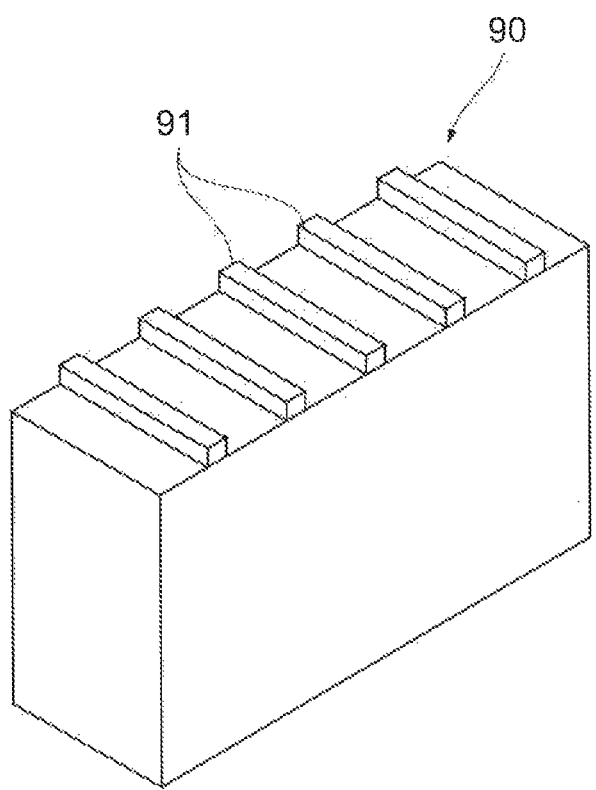
FIG. 10 is a perspective view of a buffer member provided with a rib.

As shown in FIG. 10, a surface of the buffer member 90 may be provided with, for example, a rib 91 that increases the strength in the front-back direction. This causes the strength of the buffer member 90 in the front-back direction to be high and the buffer member 90 to be crushed after absorbing a sufficient amount of collision energy, and therefore, a sufficient amount of collision energy can be absorbed by the buffer member 90.

Figure 11:
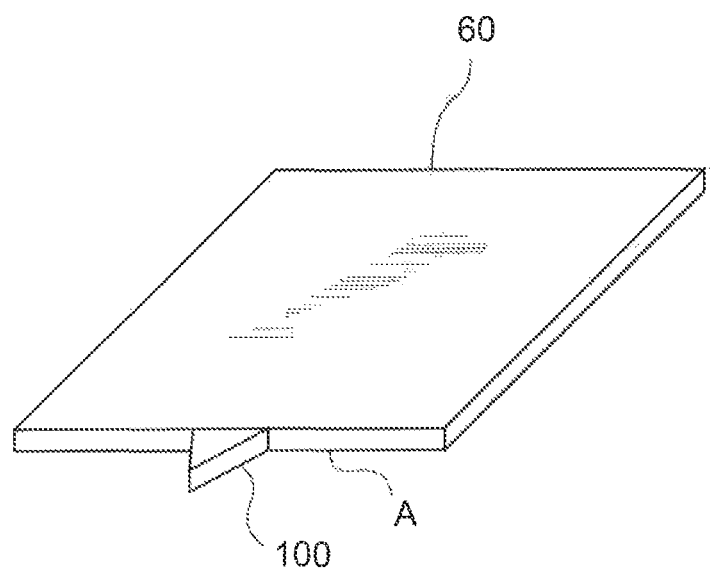
FIG. 11 is a perspective view of an assembly frame having a pointed member.
Figure 12:
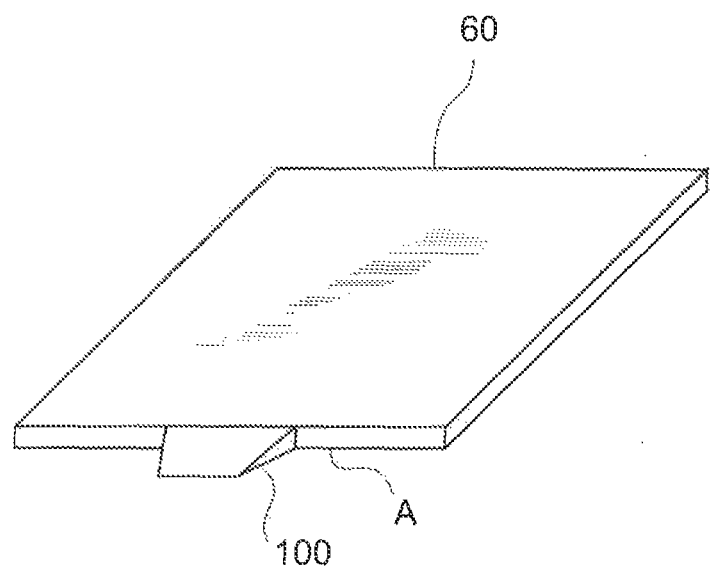
FIG. 12 is a perspective view of an assembly frame having another pointed member.

As shown in FIGS. 11 and 12, the front edge part A of the assembly frame 60 at the front side may be a pointed member 100. The pointed member 100 is made of metal such as stainless steel and an electrical conductor is used. As shown in FIG. 11, the pointed member 100 may have a ridge line of a triangular apex angle that extends in a vertical direction, or, as shown in FIG. 12, the pointed member 100 may have a ridge line of a triangular apex angle that extends in a horizontal direction. In this case, the pointed member 100 bumps into the radiator 11 during a collision of the vehicle 1 and this serves as a trigger for crushing the radiator 11. The radiator 11 can be definitely crushed to absorb the collision energy. In particular, when a hard member such as a motor of the radiator 11 and the assembly frame 60 bump into each other, the hard member such as the motor can be definitely crushed. Moreover, during the collision of the vehicle 1, insulation of the radiator 11 is desired to be secured for safety purposes, but if the pointed member 100 is an electrical conductor, the radiator 11 can be grounded when the pointed member 100 sufficiently sticks into the radiator 11.

Figure 13:
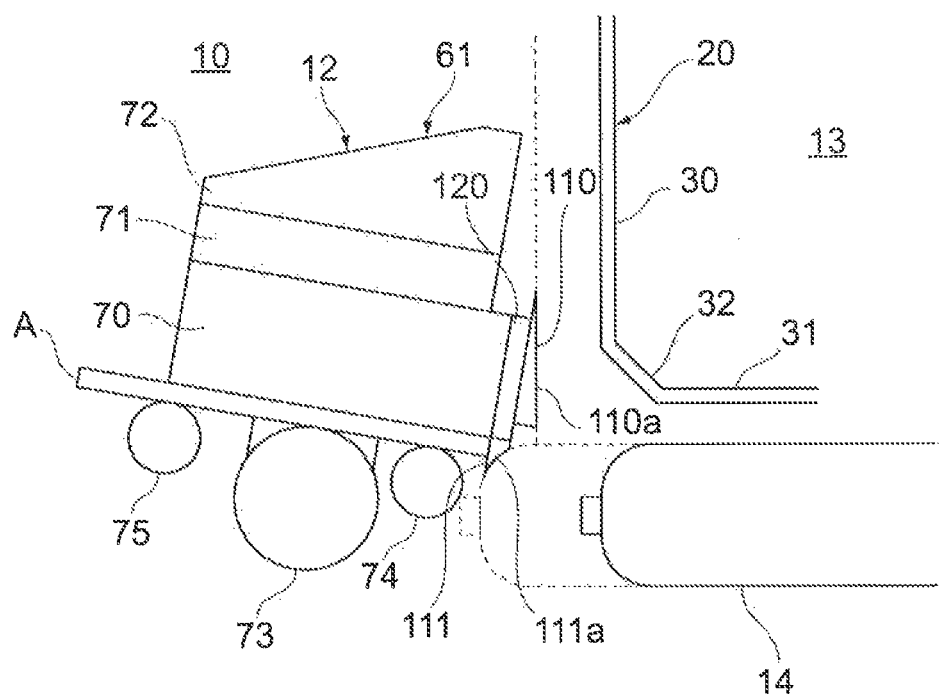
FIG. 13 is an explanatory drawing showing an overview of an internal configuration of a front room in which a fuel cell assembly is equipped with a stiffening plate.

As shown in FIG. 13, the rear end face of the fuel cell 70 may be provided with a panel stiffening plate 110 which comes into surface collision with the dash panel 20 when the fuel cell assembly 12 collides with the dash panel 20. Moreover, the rear end part of the fuel cell assembly 12 may be provided with a tank stiffening plate 111 which comes into surface collision with the fuel gas tank 14 when the fuel gas tank 14 collides with the fuel cell assembly 12.

The panel stiffening plate 110 is mounted, for example, to an end plate 120 that constitutes the rear end face of the fuel cell 70. The strength of the end plate 120 is strong among the members of the fuel cell 70 and is formed of thick iron or aluminum. The panel stiffening plate 110 is formed of, for example, a resin, and has a vertical surface 110a that is approximately parallel to the vertical part 30 of the dash panel 20 at the rear end face. The panel stiffening plate 110 has a thickness such that the vertical surface 110a is placed at the rear-most position of the fuel cell assembly 12. The panel stiffening plate 110 is formed so as to cover the upper corner of the end plate 120.

The tank stiffening plate 111 is provided, for example, at the rear end part of the fuel cell 70 or the assembly frame 60. The tank stiffening plate 11 is formed of, for example, a resin, and has a curved surface 111a that matches the curved shape of the fuel gas tank 14 at the rear end face.

The fuel cell assembly 12 may bump into the dash panel 20 during a collision of the fuel cell vehicle 1. When this happens, the dash panel 20 comes into surface collision with the panel stiffening plate 110 at the rear end face of the fuel cell 70. This enables the end plate 120 of the fuel cell 70 to be prevented from directly hitting the dash panel 20 and causing the dash panel 20 to be largely dented. As a result, the safety of the passenger compartment 13 is improved. Moreover, the fuel cell 70, the boosting converter 71 and the inverter 72 which are mounted to the upper side of the fuel cell assembly 12 can be suppressed from directly hitting the dash panel 20 and being damaged. Furthermore, a high voltage connector that is provided at the rear end face of the boosting converter 71 or the inverter 72 can be protected without using a protector, etc.

Similarly, when the fuel cell assembly 12 bumps into the fuel gas tank 14 during a collision of the vehicle 1, the fuel gas tank 14 comes into surface collision with the tank stiffening plate 111. This enables the fuel cell assembly 12 to be prevented from directly hitting and damaging the fuel gas tank 14. For example, the air compressor 73, the fuel gas pump 74 and the cooling pump 75 mounted to the underside of the fuel cell assembly 12 can be suppressed from directly hitting and damaging the fuel gas tank 14.

Figure 14A:
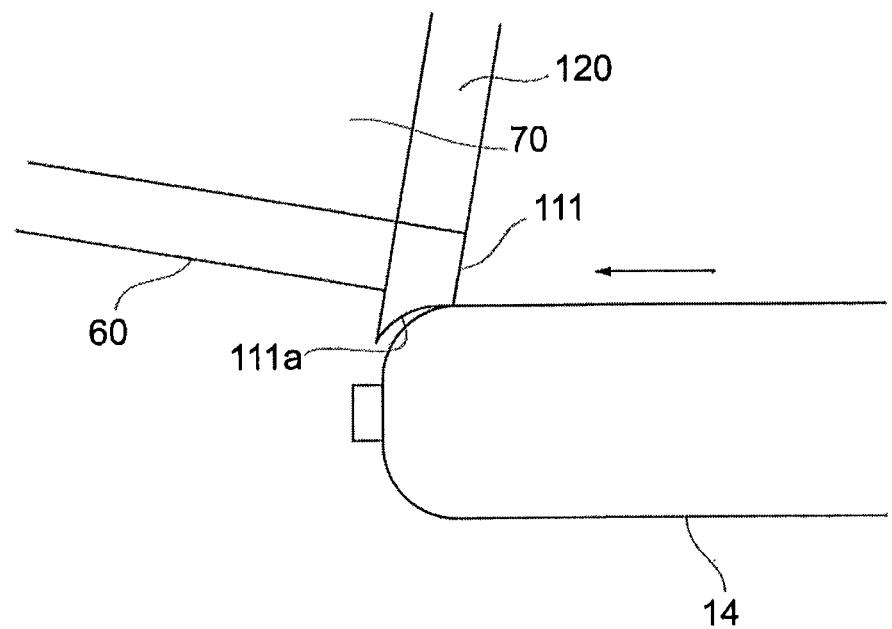
FIG. 14A is an explanatory drawing showing a situation in which a fuel gas tank collides with a stiffening plate.
Figure 14B:
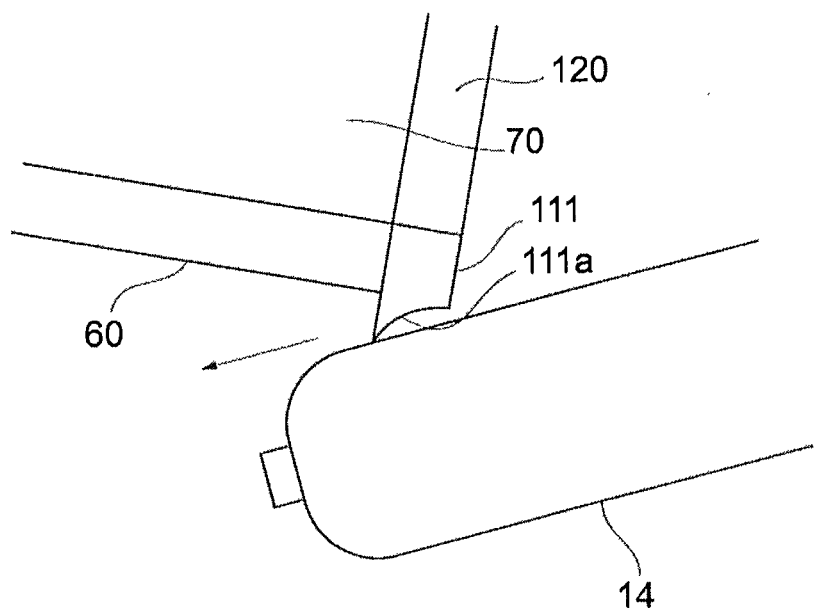
FIG. 14B is an explanatory drawing showing a situation in which a fuel gas tank escapes downward due to a stiffening plate.

In the above-mentioned embodiment, the tank stiffening plate 111 may be configured so as to allow the front side of the collided fuel gas tank 14 to escape below. This can be achieved by adjusting the position or angle of the tank stiffening plate 111 that hits the fuel gas tank 14 or adjusting the shape of the curved surface 111a of the tank stiffening plate 111. In this case, as shown in FIGS. 14A and 14B, after the fuel gas tank 14 hits the tank stiffening plate 111, the fuel gas tank 14 is shifted downward. This enables the collision energy of the fuel gas tank 14 to escape and the damage to the fuel cell assembly 12 to be suppressed.

Although preferred embodiments of the present invention have been described above with reference to the attached drawings, the present invention is not limited to such embodiments. It will be apparent to a person skilled in the art that various alterations or modifications may be made within the scope of the ideas recited in the claims and such alterations or modifications are obviously understood to fall under the technical scope of the present invention.

For example, the above-mentioned embodiments show examples in which various apparatuses of the fuel cell apparatus group 61 were used at the upper and lower surfaces of the assembly frame 60. However, the apparatuses may be provided only at the upper surface or only at the lower surface. The number of auxiliary apparatuses that are integrally mounted to the assembly frame 60 is not limited thereto and may be a plurality other than five, or may be one. The assembly frame 60 does not have to be tilted and may be horizontal. The shape of the assembly frame 60 is not limited to the shape of a flat plate. The position and number of the fuel gas tank 14 in the fuel cell vehicle 1 are not limited to such position and number.

The present invention is capable of suppressing rotation of a fuel cell when a vehicle collision occurs and minimizing damage to the fuel cell and its peripheral auxiliary apparatuses.

The present invention is useful in providing a fuel cell vehicle that is capable of suppressing rotation of a fuel cell when a vehicle collision occurs and minimizing damage to the fuel cell and its peripheral auxiliary apparatuses.

REFERENCE SIGNS LIST

1 . . . FUEL CELL VEHICLE; 10 . . . FRONT ROOM; 11 . . . RADIATOR; 12 . . . DASH PANEL; 13 . . . PASSENGER COMPARTMENT; 14 . . . FUEL GAS TANK; 12 . . . FUEL CELL ASSEMBLY; 60 . . . ASSEMBLY FRAME; 61 . . . FUEL CELL APPARATUS GROUP; 70 . . . FUEL CELL; A . . . FRONT EDGE PART OF ASSEMBLY FRAME; P . . . CENTER OF GRAVITY OF FUEL CELL ASSEMBLY

What is claimed is:

1. A fuel cell vehicle, comprising:
a radiator provided in a front room; and
a fuel cell assembly provided in a vehicle rear direction with respect to the radiator in the front room,
wherein the fuel cell assembly comprises:
an assembly frame; and
a fuel cell apparatus group that includes a fuel cell and an auxiliary apparatus, the fuel cell apparatus group being integrally mounted to the assembly frame,
wherein the assembly frame protrudes toward a forward direction of vehicle travel with respect to the fuel cell apparatus group, and
wherein the fuel cell assembly is installed in the front room such that a height of a front edge of the assembly frame at a vehicle front side approximately matches a height of a center of gravity of the entire fuel cell assembly.

2. The fuel cell vehicle according to claim 1, wherein the assembly frame is formed into a flat plate shape, and the fuel cell apparatus group is integrally mounted to upper and lower surfaces of the assembly frame.

3. The fuel cell vehicle according to claim 1, wherein the assembly frame is provided in a tilted attitude such that the vehicle front side is high and a vehicle rear side is low.

4. The fuel cell vehicle according to claim 1, wherein front edge of the assembly frame at the vehicle front side is at a higher position than that of a motor shaft of a fan of the radiator.

5. The fuel cell vehicle according to claim 1, wherein the fuel cell apparatus group mounted to an underside of the assembly frame is disposed at a position that is deviated in a width direction of the vehicle from a vehicle rear position on an extension line of the motor shaft of the fan of the radiator.

6. The fuel cell vehicle according to claim 1, wherein a buffer member is provided between the fuel cell apparatus group and the radiator.

7. The fuel cell vehicle according to claim 6, wherein an air cleaner, an air intake or an ion exchanger is used for the buffer member.

8. The fuel cell vehicle according to claim 1, wherein the front edge of the assembly frame at the vehicle front side is a pointed member.

9. The fuel cell vehicle according to claim 8, wherein the pointed member is an electric conductor.

10. The fuel cell vehicle according to claim 1, wherein the vehicle rear side of the fuel cell assembly is provided with a dash panel that separates the front room from a passenger compartment, and wherein an end face of the fuel cell at the vehicle rear side is provided with a panel stiffening plate which comes into surface collision with the dash panel when the fuel cell assembly collides with the dash panel.

11. The fuel cell vehicle according to claim 1, wherein a lower part of the vehicle rear side of the fuel cell assembly is provided with a fuel gas tank, and an end part of the fuel cell assembly at the vehicle rear side is provided with a tank stiffening plate which comes into surface collision with the fuel gas tank when the fuel gas tank collides with the fuel cell assembly.

12. The fuel cell vehicle according to claim 11, wherein the tank stiffening plate is configured so as to allow the vehicle front side of the collided fuel gas tank to escape below.

13. The fuel cell vehicle according to claim 1, wherein the auxiliary apparatus includes at least one of a boosting converter provided above the assembly frame, an inverter provided above the assembly frame, a pump provided beneath the assembly frame, or an air compressor provided beneath the assembly frame, and wherein the fuel cell is provided above the assembly frame.

* * * * *